United States Patent [19]

Chonan et al.

[11] Patent Number: 4,891,138

[45] Date of Patent: Jan. 2, 1990

[54] METHOD OF SEPARATING AND TRANSFERRING ION-EXCHANGE RESIN

[75] Inventors: Kanroku Chonan, Kanagawa; Kazuyuki Koyama, Saitama; Masahiro Hagiwara, Kanagawa, all of Japan

[73] Assignee: Ebara Corporation, Tokyo, Japan

[21] Appl. No.: 137,714

[22] Filed: Dec. 24, 1987

[30] Foreign Application Priority Data

Dec. 25, 1986 [JP] Japan ................................. 61-307763
Mar. 18, 1987 [JP] Japan ................................. 62-61384

[51] Int. Cl.⁴ .......................... B01J 47/04; B01J 49/00
[52] U.S. Cl. ..................................... 210/675; 209/158; 210/686; 521/26
[58] Field of Search ................................. 209/158–161, 209/454; 210/675, 686; 521/26

[56] References Cited

U.S. PATENT DOCUMENTS

| 3,583,908 | 6/1971 | Crits | 210/686 |
| 3,719,591 | 3/1973 | Crits | 210/686 |

FOREIGN PATENT DOCUMENTS

| 27022987 | 5/1978 | Fed. Rep. of Germany . |
| 48-5669 | 1/1973 | Japan . |
| 55-14718 | 6/1978 | Japan . |
| 54-20312 | 4/1979 | Japan . |
| 54-6339 | 5/1979 | Japan . |
| 55-20636 | 2/1980 | Japan . |
| 55-88860 | 7/1980 | Japan . |
| 58-15016 | 3/1983 | Japan . |
| 58-86454 | 5/1983 | Japan . |
| 58-27982 | 6/1983 | Japan . |
| 59-5015 | 2/1984 | Japan . |
| 60-34745 | 5/1984 | Japan . |
| 59-35260 | 8/1984 | Japan . |
| 60-58240 | 4/1985 | Japan . |
| 60-17229 | 5/1985 | Japan . |
| 60-122045 | 6/1985 | Japan . |
| 60-132653 | 7/1985 | Japan . |
| 60-57373 | 12/1985 | Japan . |
| 61-32054 | 7/1986 | Japan . |

1498139 1/1978 United Kingdom .

Primary Examiner—Ivars Cintins
Attorney, Agent, or Firm—Wenderoth, Lind & Ponack

[57] ABSTRACT

A method for separating and transferring an ion-exchange resin having the lower specific gravity from an ion-exchange resin having the higher specific gravity in an ion-exchange resin separating tank that is indispensable to a pure or ultrapure water producing plant and which is packed with a mixed bed of ion-exchange resins having different specific gravities is disclosed.

This method contains the following essential steps: (1) a first step in which the mixed resin bed is separated into two layers by backwashing and the greater part of the ion-exchange resin (SBR) having the lower specific gravity is transferred by means of a perforated sluicing pipe that is disposed below the interface between the separated resin layers and a resin transfer pipe that is disposed above said sluicing pipe; (2) a second step in which SBR that is left untransferred in the first step is separated to be situated above the layer of the ion-exchange resin (SAR) having the higher specific gravity; and (3) a third step in which sluicing water is introduced into the tank at high flow rate through the sluicing pipe so that the particles of SBR are lifted in the water in the freeboard above the resin layer, while pressurized water is introduced from the top of the tank so as to transfer the residual SBR through the resin transfer pipe.

According to the process of the present invention, substantially complete separation and transfer of SBR can be accomplished by operations in a fully automatic and unattended way, with the volume of SAR being held constant at all times after the transfer of SBR. If the process is applied to the condensate demineralizing system in a PWR power plant which requires stricter control of water quality that a thermal power plant, the sequence of the second and third steps may be repeated after the third step so as to reduce the total level of residual SBR to 0.05% of the total anion resin and below.

5 Claims, 4 Drawing Sheets

METHOD OF SEPARATING AND TRANSFERRING ION-EXCHANGE RESIN

BACKGROUND OF THE INVENTION

The present invention relates to an apparatus for producing pure or ultrapure water. More particularly, the present invention relates to an apparatus for the condensate polishing system in thermal and nuclear power plants.

Mixed beds of strongly acidic cation-exchange resins (hereinafter referred to as SAR) having the greater specific gravity and strongly basic anion-exchange resins (hereinafter abbreviated as SBR) having the smaller specific gravity, are indispensable to apparatus for producing pure and ultrapure water. The standards for the quality of water at the outlet of the mixed bed of resins are the strictest in nuclear power plants employing pressurized water reactors (PWR) and the outlet water is required to contain sodium ion ($Na^+$) and chloride ion ($Cl^-$) in amounts not exceeding 0.02 ppb and 0.05 ppb, respectively. The lower the concentrations of these ions, the better. The leakage of these ions from the mixed-bed is governed by the proportions of salt-form resins in the mixed bed if the quality of the inlet water of the demineralization tank and the operating conditions for the mixed bed (e.g. service flow rate) are disregarded. Specifically, the higher the proportions of R—Cl (chloride-form anion resin) and R—Na (sodium-form cation resin), the greater the leakage of $Na^{30}$ and $Cl^-$. The major source of these ions is of course the raw water but they are also formed by the following reasons:

R—Na: Separation between SAR and SBR and subsequent transfer of SBR are incomplete and the SAR in the SBR layer contacts regenerant NaOH to form R—Na.

R—Cl: (1) This partly originates from NaCl present as an impurity in the regenerant NaOH; and (2) As in the case of the generation of R—Na, separation and transfer of SBR is incomplete and the residual SBR in the SAR layer contacts regenerant HCl to form R—Cl.

If $H_2SO_4$ is used as a regenerant, sulphate-form resins (R—$SO_4$) will be generated to cause the problem of $SO_4^{--}$ leakage.

Various studies have been conducted with a view to reducing the generation of R—Na and a representative approach is described in Japanese Pat. No. 1027750 (Japanese Patent Publication No. 14718/1980). Of the two principal causes of the generation of R—Cl, the first one has become less significant as a result of recent improvements in the quality of the regenerant NaOH. However, no complete solution has been proposed for dealing with the second cause. The current technology does not provide for complete separation and transfer of SBR and the presence of residual SBR in the SAR layer in an approximate amount of 1-2% of the total SBR is inevitable. This means that for each cycle of regeneration, the R—Cl type SBR forms in an amount of 1-2% of the total SBR and as a result of accumulation of this residual SBR, R—Cl in the mixed resin bed amounts to twenty-odd % of the total SBR at equilibrium.

Conventionally, SBR is separated from SAR and transferred by the following typical procedures. FIG. 6 is a schematic diagram of an apparatus that is employed to perform these procedures. Backwashing water 3 is introduced into the resin-packed tank from below at a linear velocity (hereinafter abbreviated as LV) of 8-12 m/hr. After thorough backwashing to achieve separation between the two resin layers, both SAR and SBR are allowed to settle and sluicing water 6 is introduced into the tank from below at an LV of 2.5-4 m/hr so as to fluidize the SBR layer 2. At the same time, compressed air 7 is introduced from the top of the tank, thereby transferring SBR to the anion regeneration tank (not shown). Not only the SBR layer 2 but also SAR layer 1 is slightly fluidized by supplying the sluicing water 6.

In FIG. 6, the open end 4' of a resin transfer pipe 4 is disposed on the central axis of the tank. Alternatively, The open end 4'may be disposed close to the wall of the tank or it way be in the form of a "trough". For the purpose of minimizing the amount of residual SBR, the pipe 4 is disposed in such a way that the open end 4' is positioned slightly below the interface c between the two resin layers at the time when sluicing water 6 is introduced, and this is a commonly employed practice in commercial operations of condensate demineralization.

However, the above procedures for transferring SBR inevitably cause a portion of SBR to remain in the tank in a thickness ranging from a few to twenty-odd millimeters as indicated in FIG. 7 by a hatched area 2'. This can be explained as follows: the farther away from the open end 4' the SBR is situated, the longer it takes for the SBR to reach this open end, with the result that in the mean time the resin situated in the neighborhood of the open end 4' is transferred through the pipe 4; at the same time, the sluicing water 6 being supplied from of the bottom of the tank causes the resin surface to become flat, creating a certain distance between the open end 4' and the resin surface as indicated by l in FIG. 7; as a result, a portion of the SBR remains to be sucked into the pipe 4 through the open end 4' and fails to be transferred through the pipe.

These phenomena do occur even if the flow rate of sluicing water 6 or the ratio of expansion of SAR layer 1 by backwashing is increased or even if the position or geometry of the open end 4' is changed, and complete separation and transfer of SBR cannot be achieved.

Upon closer examination, the SBR that has been left unseparated from SAR after processing in the apparatus shown in FIG. 6 has a profile as depicted in FIG. 8. The residual SBR consists of the following three portions:

X: SBR 2' situated on the surface layer of SAR and which is hatched in FIG. 8 (the same as SBR 2' in FIG. 7);

Y: SBR 2" that is left in the neighborhood of the lower water collecting unit 10 and which is also hatched in FIG. 8; and Z: SBR left in the interior of the SAR layer.

Portion Y of the residual SBR is unavoidably trapped in the neighborhood of the lower water collecting unit 10 when the mixed resin bed is transferred from a demineralizing tank (not shown) to the cation regenerating tank (which also serves as a separation tank), and residual SBR of this type occurs in a substantial amount irrespective of whether the lower water collecting unit is in the form of a perforated plate or a perforated pipe. This resin cannot be displaced or purged by the simple technique of backwashing and its volume sometimes amounts to as many as 1-3% of the total SBR.

The method currently employed to purge the residual SBR 2" is to supply backwashing water together with air that is simultaneously introduced into the lower water collecting unit in the same manner as air scrubbing is performed by conventional means.

Portion Z of residual SBR can be removed by performing thorough backwashing after the problem with Y has been solved. Under ordinary conditions, the residual SBR and SAR is present in an amount of 0.05% or less. The SBR content can be further lowered by selecting an SAR/SBR combination that affords a great difference in both the specific gravity and the particle size distribution.

For successful separation and transfer of SBR, it is important that the actions taken to deal with the problems associated with Y and Z be thorough enough to collect the greatest part of residual SBR as SBR 2' which is indicated by the hatched area on the surface layer of SAR 1 so that it can easily transferred from the tank.

To this end, the following requirements for system design and operation must be satisfied:

(a) Separation between SAR and SBR and subsequent transfer of SBR are as complete as possible;

(b) After SBR transfer, the level of SAR layer 1 is held constant;

(c) These two requirements are met in spite of slight variations in designed flow rates and in the temperature of backwashing water;

(d) The apparatus employed is simple in construction;

(e) High process reliability is ensured in a consistent manner even if the apparatus is operated unattendedly in a fully automatic way; and (f) The resins employed are wear-resistant.

The requirement (a) is an obvious condition to be satisfied but (b) is also a particularly important condition. In the process depicted in FIG. 6, sluicing water 6 is introduced into the tank from below, so requirement (b) is difficult to meet if the flow rate or temperature of the water fluctuates. Condensate demineralizing plants are typically composed of 2-10 demineralizing tanks and 2-3 regeneration tanks, and if condition (b) is not met, the balance in the quantities of resins is upset progressively and condition (a) also fails to be satisfied, causing deterioration of the performance of the demineralizing tanks.

The process shown in FIG. 6 does not fully satisfy requirements (a), (b), (c) and (d).

Other processes have been proposed for transferring SBR as a separate layer from SAR. The system disclosed in Unexamined Published Japanese Patent Application (kokai) No. 5669/1973 is shown schematically in FIG. 9. In this system, distance A from the interface d between separated stationary beds to an intermediate sluicing pipe 11 is set at a value between 50 and 300 mm, and distance B from d to a resin transfer pipe 4 is set at a value between 0.5×A and 0.6×A. After separation into two layers, SAR 1 and SBR 2, sluicing water 6 is introduced through the intermediate sluicing pipe 11 in the upper layer of SAR 1 so as to attain a bed expansion ratio of 80-120% for SBR 2 by backwashing, with SBR 2 being selectively transferred through the resin pipe 4 in the lower layer of SBR 2.

This process intends to transfer SBR, but not SAR, so the temperature and flow rate of the sluicing water 6 must be controlled as in the system shown in FIG. 6. Furthermore, this process also fails to fully satisfy requirement (a).

Japanese Utility Model Publication No. 17229/1985 discloses a system which, instead of a simple resin transfer pipe of the type shown in FIG. 6, employs a pipe with an opening that extends across the tank and which is positioned adjacent and in a face-to-face relationship with the header of a perforated intermediate sluicing pipe.

The open side of this transfer pipe is positioned slightly below the interface between two separated stationary resin beds, with sluicing water being introduced through the intermediate sluicing pipe at an LV of 2.5-4 m/hr while compressed air is introduced into the tank from its top, thereby accomplishing selective transfer of SBR. In this process, not only SBR but also the SAR lying above the intermediate sluicing pipe is transferred.

This method fully satisfies condition (b) but not condition (a), and the equipment it employs is complex in composition.

Japanese Patent Publications Nos. 6339/1981 and 20312/1983, as well as British Pat. No. 1,498,139 propose a process in which a plurality of spray nozzles that are disposed at the interface between two separated resin beds, or which are arranged in two rows, one above the interface and the other below said interface, produce horizontal water jets that separate one resin bed from the other and transfers it to a regeneration tank. However, this method also requires the use of complicated equipment and has yet to be commercialized.

The processes proposed in Unexamined Published Japanese patent application (kokai) Nos. 132653/1985, 34745/1985 (corresponding to U.S. Ser. No. 493,828) and German Pat. No. 2,702,987 fail to fully satisfy conditions (a) to (d).

SUMMARY OF THE INVENTION

An object, therefore, of the present invention is to provide a method for transferring SBR as a separate entity from SAR, with the amount of residual SBR, in particular SBR 2' remaining on the surface layer of SAR (i.e., residual SBR of type X), being minimized during transfer of SBR after it is separated in the resin separation tank. This method satisfies conditions (a) to (d) while enabling unattended operation in a fully automatic and highly reliable manner.

In order to attain this object by solving the problems associated with the prior art processes for transferring SBR as it is sharply separated from SAR, the present inventors conducted intensive studies employing a separation tank of commercial scale with a large diameter. The present invention has been accomplished on the basis of these studies.

The present invention provides a method for a separating and transferring an ion-exchange resin from a tank packed with a mixed bed of two ion-exchange resins having different specific gravities, said method comprising:

(A) a first stage in which the mixed ion-exchange resin bed is separated into two layers by backwashing and allowed to settle, and sluicing water is introduced into the tank through a perforated separating/transferring intermediate sluicing pipe positioned below the interface between the separated resin layers, and pressurized water is introduced into the tank from above, while the greater part of the ion-exchange resin in the upper layer having the smaller specific gravity is transferred through the opening of a resin transfer pipe positioned above said intermediate sluicing pipe;

(B) a second stage wherein backwashing water is introduced both through a lower water collecting unit and through the intermediate sluicing pipe or solely through said lower water collecting unit, so as to perform backwashing in such a way that the residual ion-exchange resin having the smaller specific gravity that forms in the first step is separated to be situated above the layer of the ion-exchange resin having the greater specific gravity; and (C) a third stage in which after resin settling, sluicing water is introduced at a high flow rate through the intermediate sluicing pipe so that the ion-exchange resin having the smaller specific gravity is lifted as particles in water in the freeboard above the resin layer, while pressurized water is introduced from above the tank so as to direct the ion-exchange resin having the smaller specific gravity to the opening of the resin transfer pipe to be transferred therethrough.

DETAILED DESCRIPTION OF THE INVENTION:

A typical example of the composition of devices to be installed in the separation tank and of the state of resin packed in it is hereinafter described with reference to FIG. 1, which shows the state of the separation tank after a mixed bed of resins received from a demineralizing tank (not shown) has been separated into two layers by backwashing and settled to form a stationary bed.

A perforated separating/transferring intermediate sluicing pipe 11 is disposed below the interface d between two separated resin layers SAR and SBR, and a resin transfer pipe 4 is disposed in such a way that its open end 4' is situated above the intermediate sluicing pipe 11.

For the practice of the present invention, the distance ($L_1$) between each of the lateral pipes 12 on the intermediate sluicing pipe 11 and the position f of the open end 4' of the transfer pipe 4 is preferably set at 50 mm and above, more preferably at 80 mm and above.

The distance ($L_2$) between the interface d and the position f varies depending upon the amount of resin being transferred from the demineralizing tank. The process of the present invention can of course be performed successfully the level of d is above that of f. Even if the level of d is below f, the process of the present invention can be performed satisfactorily if $L_2$ is not more than about half the value of $L_1$.

Figure 1:
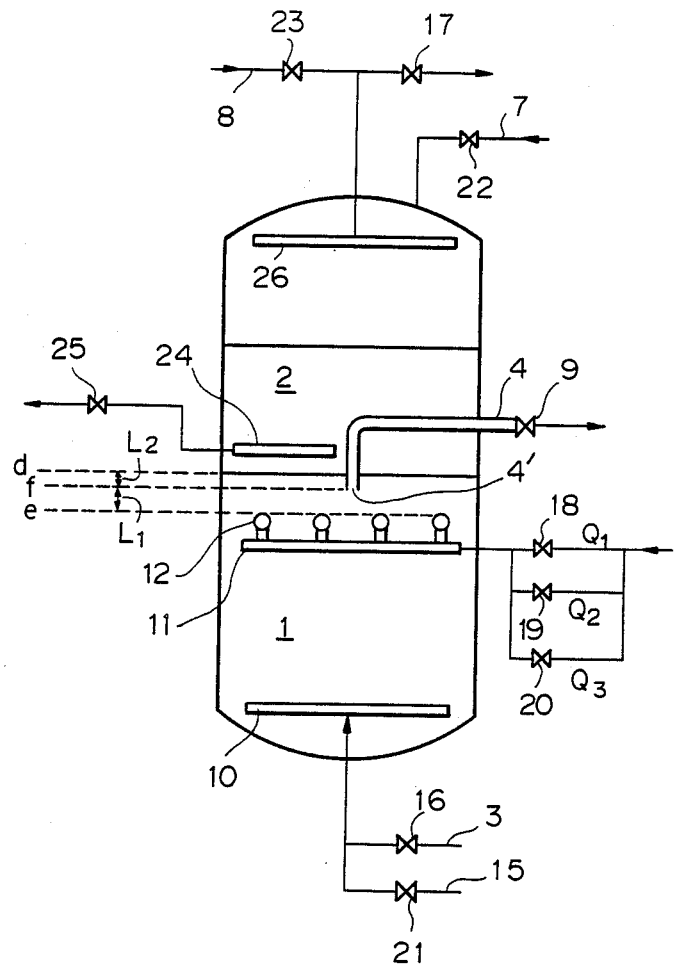
FIG. 1 is a schematic diagram showing the general layout of an apparatus that may be used to implement the process of the present invention.

In FIG. 1, the open end 4' if the transfer pipe 4 is positioned on the central axis of the tank but it may be disposed in the neighborhood of the wall of the tank. In FIG. 1, the intermediate sluicing pipe 11 has four lateral pipes 12 but the number of lateral pipes to be employed may vary depending upon the diameter of the tank.

The process of the present invention is performed in the separation tank equipped with the devices arranged in the manner described above. This process will proceed as follows.

The mixed resin bed transferred from the demineralizing tank is backwashed and separated into two layers, with SAR 1 having the greater specific gravity being positioned below SBR 2 having the smaller specific gravity. Thereafter, sluicing water $Q_1$ is introduced into the tank through the intermediate sluicing pipe 11 while pressurized water 8 is introduced from the top of the tank so as to transfer the greater part of SBR to an anion regeneration tank (not shown). These procedures complete the first stage of the process of the present invention. In this stage, the linear velocity of $Q_1$ may be within the commonly employed range of 2.5-4 m/hr.

As a result of the first step, the greater part of SBR is transferred to the anion regeneration tank and, at the same time, SAR situated above position f of the open end 4' of the resin transfer pipe 4 is also transferred together with SBR.

Figure 8:
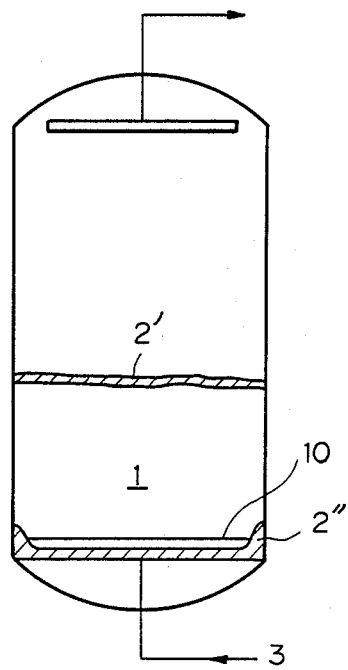
FIGS. 7 and 8 illustrate how residual SBR forms in the prior art method.
Figure 7:
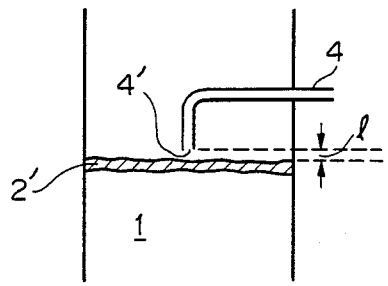
Figure 9:
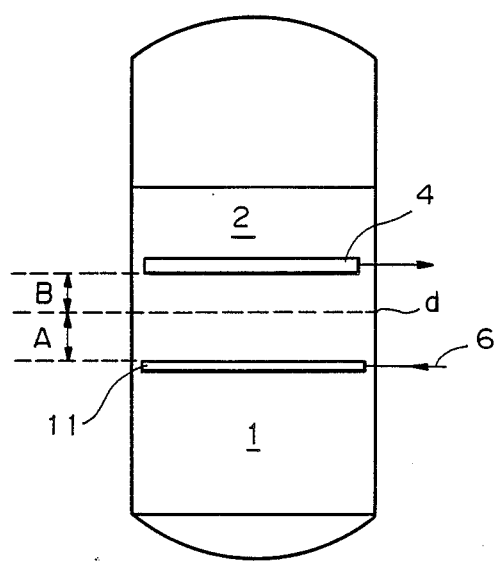
FIG. 9 is a schematic diagram of an apparatus that is employed to implement another prior art process.

A typical profile of the SBR that is left untransferred from the separation tank in the first step is shown in FIG. 8 and the residual SBR is composed of the following three portions: SBR 2' lying over the SAR layer, SBR 2" present in the neighborhood of the lower water collecting unit, and a smaller amount of SBR remaining in the interior of SAR layer 1 (the last-mentioned portion is not shown in FIG. 8). The portions of residual SBR that are present in large amounts are indicated as SBR 2' and SBR 2". SBR 2" and SBR which stays in a small amount in the interior of SAR layer 1 are purged by introducing air together with backwashing water as in the case of air scrubbing, thereby allowing these two portions of residual SBR to be collected on the SAR layer 1 together with SBR 2'.

These procedures may be taken before the first stage.

In the next step, backwashing is performed by introducing backwashing water 3 into the tank through the lower water collecting unit 10 at an LV of 6-12 m/hr which is commonly employed in the art. Either at the same time or several minutes after the backwashing, sluicing water $Q_2$ is introduced through the intermediate sluicing pipe 11 at a faster flow rate than $Q_1$, typically at an LV of 5-20 m/hr, preferably 10-16 m/hr. This second step is performed in order to ensure that SBR 2"and the smaller amount of SBR, which have been dispersed in the SAR layer 1 as a result of the first step and the subsequent purging with the two-phase stream, are permitted to move to the surface layer of SAR 1 so that they can be collected as SBR 2'. This purpose can be effectively attained by introducing backwashing water 3 together with sluicing water $Q_2$ that is supplied through the intermediate sluicing pipe 11.

A settling operation then follows. For successful performance of the subsequent third step, the settling operation is preferably carried out by continuing the supply of sluicing water $Q_2$ while stopping the supply of backwashing water 3. It suffices that the SAR layer lying below the intermediate sluicing pipe 11 is allowed to settle in this step.

Figure 4:
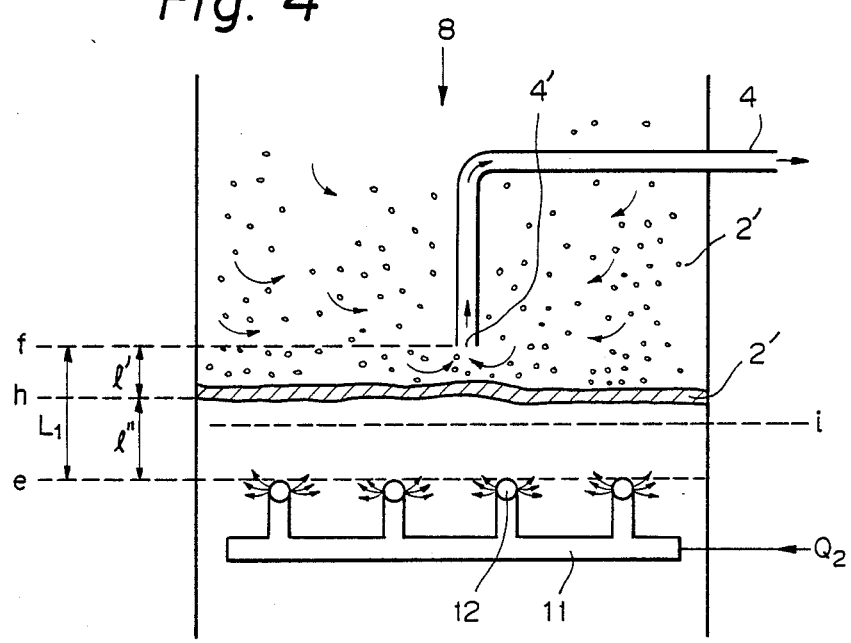
FIG. 4 is a sketch showing how water is jetted from lateral pipes on a resin transferring intermediate sluicing pipe in the third step of the process of the present invention, as well as how the upper resin layer 2' moves around in the tank.

In the subsequent third stage, sluicing water is introduced into the tank at a flow rate as high as the rate at which sluicing water $Q_2$ is supplied in the second step. At the same time, pressurized water 8 is introduced from above the tank so as to direct SBR 2′ to the open end 4′ of the resin transfer pipe 4 and transfer it through that pipe. This third step is most important for attaining the objects of the present invention. The movement of resins SAR and SBR in the third step is illustrated in FIG. 4.

Sluicing water $Q_2$ is jetted through lateral pipes 12 on the intermediate sluicing pipe 11 so as to lift the particles of residual SBR 2′ in water in the freeboard above the resin layer and to transfer SBR 2′ through the pipe 4. The particles of lifted SBR 2′ are sucked into the open end 4′ of the pipe 4 under the pressure of water 8 being supplied at an LV of 4–5 m/hr, as indicated by arrows in FIG. 4, and are smoothly transferred through the pipe 4.

The SAR above the lateral pipes 12 is fluidized depending upon the flow rate of sluicing water $Q_2$ and part of the particles in the resin bed expanded by backwashing are lifted and transferred together with SBR 2′. However, as the resin transfer proceeds, the distance l′ between the open end 4′ of the pipe 4 and the surface layer of SAR that lies above the lateral pipes 12 and which is being expanded in volume by backwashing increases, thereby decreasing the amount of SAR whose particles are lifted and transferred but increasing the proportion of SBR 2′ whose particles are lifted and transferred. By continuing this resin transfer for several to ten-odd minutes, substantially all part of SBR 2′ is transferred from the separation tank through the pipe 4.

The present inventors discovered this phenomenon in an experiment on a large-scale separation tank and found that it was advantageous for the purpose of selectively transferring the residual SBR 2′.

In order to lift the particles of SBR 2′ in water in the freeboard above the resin layer, the following requirements should be satisfied:

(1) lateral pipes 12 on the intermediate sluicing pipe 11 are properly designed;

(2) the distance ($L_1$) between the open end 4′ of the resin transport pipe 4 and the lateral pipes 12 is properly selected;

(3) water is present above the open end 4′ of the transfer pipe 4, with the freeboard being preferably filled with water; and (4) prior to third stage, the greater part of SBR is transferred in the first stage so as to minimize the amount of residual SBR 2′.

Figure 2:
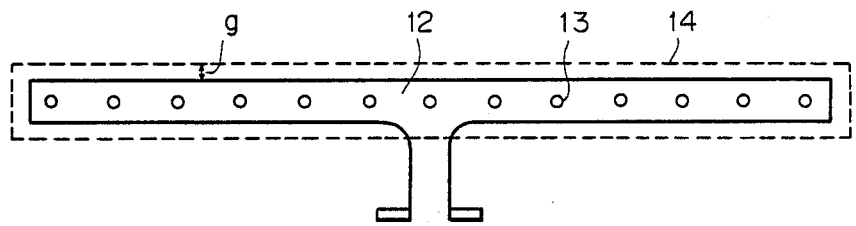
FIG. 2 is a side view of an exemplary lateral pipe that may be employed in the present invention.
Figure 3:
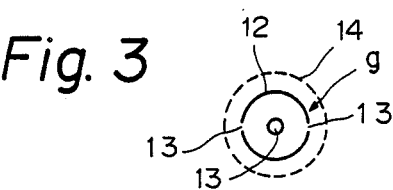
FIG. 3 is an end view of the lateral pipe shown in FIG. 2.

An example of the intermediate sluicing pipe 11 that may be employed in the present invention is shown in FIGS. 2 and 3. As shown in FIG. 2, each of the lateral pipes 12 on the intermediate sluicing pipe 11 is provided with orifices 13 at given pitches and is entirely covered with a net 14. FIG. 3 is an end view of the lateral pipe, which shows that an orifice 13 is also provided at both ends of the lateral pipe.

Net 14 may be of any design that permits the passage of water but not ion-exchange resins, and a suitable example is a synthetic fiber filter cloth (e.g. Saran ® net), a wire net or a wedge wire net.

The following are the two most important considerations for designing lateral pipes on the intermediate sluicing pipe 11:

(1) a gap g of about 3–10 mm is provided between the inside surface of the net 14 and the surface of the lateral pipe 12; and (2) when residual SBR 2′ is transferred in the third step, water is jetted through orifices in the lateral pipe at a high speed, preferably $V_1 = 4$ m/sec or higher.

The present inventors found that when, under the conditions (1) and (2), sluicing water $Q_2$ was introduced at an LV of at least 5 m/hr, preferably at least 10 m/hr, the water jetted from the lateral pipes 12 through horizontal orifices 13 impinged against the net 14 and spread sufficiently, in particular, in horizontal and upward directions, to cause the particles of less heavy SBR to be lifted as shown in FIG. 4.

If $V_1$, or the speed at which water is jetted through orifices 13, and the flow rate of sluicing water $Q_2$ are increased, the scope of water spread in the horizontal and upward directions is correspondingly increased and SBR 2′ on the surface layer becomes so turbulent that its particles are lifted in various areas of the layer as if they were "bumping".

The greater the value of $V_1$, the more effective the process of the present invention is but, at the same time, the pressure drop is also increased. Therefore, to avoid undue constraints on process design, $V_1$ is preferably set at 8 m/sec and below. Specifically, it is preferred that sluicing water $Q_2$ is supplied at an LV of 10 m/hr and above while orifices 13 are designed to ensure $V_1$ of at least 4 m/sec.

If the position e at which the so designed intermediate sluicing pipe 11 is disposed is determined, the position f of the open end 4′ of the resin transfer pipe 4 is then selected so that it matches e. Stated specifically, $L_1$ or the distance between e and f is typically set at 50 mm or greater, preferably 80 mm or greater, in the embodiment shown in FIG. 1. If $L_1$ is small, the distance (l″) between the level e of the top of lateral pipe 12 and the position h of the surface layer of SAR being expanded in volume by backwashing with sluicing water $Q_2$ is also decreased and it becomes impossible to ensure effective lifting of the particles of SBR 2′. If the supply of sluicing water $Q_2$ is increased to an LV of 10 m/hr and more, the value of l′ increases as the resin transfer proceeds and will eventually level off at 25–35 mm in ordinary operations. Therefore, if $L_1$ is decreased, l″ decreases correspondingly. It is important for the purposes of the present invention that the particles of SBR 2′ are effectively lifted and to this end, l″ and, hence $L_1$ must be maintained at a certain value and above. According to the experiment conducted by the present inventors, the effective value of $L_1$ was preferably at least 80 mm, more preferably between 100 and 180 mm. If $L_1$ is excessive, l″ also becomes excessive, which is unfavorable for the purpose of effectively lifting the particles of SBR 2′.

Figure 5:
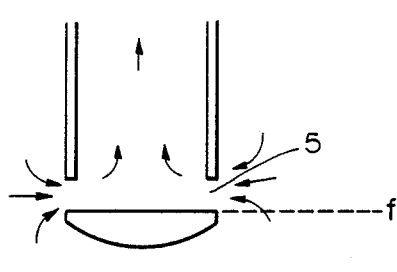
FIG. 5 shows an example of the opening of the resin transfer pipe.
Figure 6:
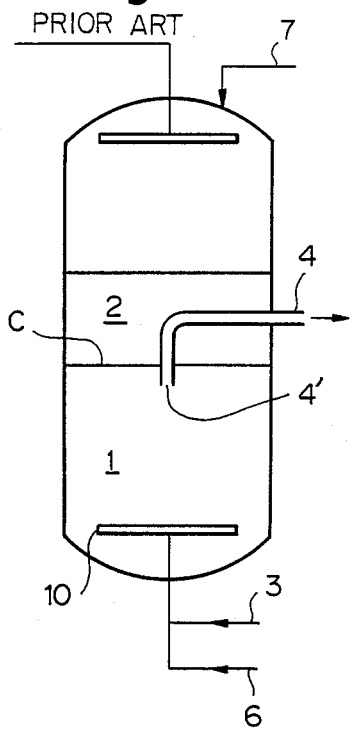
FIG. 6 is a schematic diagram of an apparatus employed in a prior art process.

The open end 4′ of the resin transfer pipe 4 may have a simple shape as shown in FIG. 5. The arrows in FIG. 5 indicate the direction of a resin stream. As shown, the open end 4′ of the transfer pipe 4 may be of such a shape that SBR 2′ is sucked in horizontally, not from beneath the open end 4′. In order to ensure that the resin will not wear during its transfer, the total area of the cutout 5 through which the resin is sucked into the open end 4′ may be such that it permits the passage of sluicing water $Q_2$ and pressurized water 8 at a total LV of not faster than 7,000 m/hr. As shown in FIG. 5, the position f of open end 4′ is flush with the bottom end of the cutout 5.

Almost all of the residual SBR 2' can be transferred from the separation tank by carrying out the third stage with the interior parts of the tank being designed as described in preceding paragraphs. After the transfer of SBR 2', the level of SAR 1 is shifted to the position indicated by i in FIG. 4 when the resin bed becomes stationary. In the process of the present invention, the level i of SAR after the transfer of SBR 2' remains virtually constant irrespective of substantial variations in the flow rate and temperature of sluicing water $Q_2$.

In the process of the present invention, SAR situated below the lateral pipes 12 on the intermediate sluicing pipe 11 is fixed and is not fluidized at all, and only SAR that is situated above the lateral pipes 12 is fluidized. In the experiment conducted by the present inventors, the variation in the position i was only about 10-15 mm when sluicing water $Q_2$ was supplied at a flow rate (LV) of 12-16 m/hr with its temperature held between 10° and 30° C. This result may be explained as follows: if the distance between i and e is small, the surface layer of SAR becomes significantly turbulent and the position i is governed not by the conventional concept of the ratio of bed expansion by backwashing which largely depends on flow rate and water temperature, but by the degree of turbulence in the surface layer of SAR.

In the commercial separating tank, the height of SAR 1 is typically on the order of 1,500 mm and the variation in the level of SAR 1 after the transfer of SBR 2' is as small as 1%.

The process of the present invention fully satisfies the requirement that the level of SAR 1 should remain fairly constant after transfer of SBR 2'.

The present inventors conducted an experiment in which a mixed resin bed received from a demineralizing tank was separated into two layers by backwashing and subjected to a settling treatment for producing a stationary bed. In this experiment, SBR 2' could be transported smoothly even when the position d (see FIG. 1) of the interface between separated layers fluctuated considerably. Under ordinary conditions, the position of d is preferably adjusted close to the position of the open end 4' but, at $L_1=150$ mm, no problem occurred in the transfer of SBR 2' even when the position of d dropped 50 mm below the open end 4'. This is because in the process of the present invention, the success of the transfer of SBR 2' depends on the height (l'') of the SAR layer situated above the lateral pipes 12 that is being expanded in bed volume by backwashing with sluicing water $Q_2$ as shown in FIG. 4. According to the present invention, selective separation and transfer of SBR 2' can be satisfactorily accomplished while keeping the level of SAR 1 constant after the transfer of SBR 2'. In operations with a separation tank having a diameter of 1,800 mm, SBR 2' could be smoothly separated and transferred without being substantially influenced by variations in the temperature of sluicing water $Q_2$ between 10° and 30° C. and in its flow rate between 30 and 40 m$^3$/hr (12 and 16 m/hr in LV). Because of this operational stability, the process of the present invention enables resin separation to be performed in a fully automatic and unattended way.

The process of the present invention has the additional advantage of simplicity in equipment design as is clear from FIGS. 1 and 4. Furthermore, the resin separation and transfer can be performed with the conventionally employed concentration of resin slurry that does not involve any potential of resin wear.

In the process of the present invention, part of SAR is also transferred to an anion regeneration tank together with SBR 2. The so transferred SAR will become a resin of R—Na form upon contact with NaOH used as a regenerant for SBR. The formation of the R—Na form resin may be prevented by a conventional method such as the one disclosed in Japanese Pat. No. 1027750.

In the process of the present invention, SBR is separated and transferred almost completely in a separating-/cation regenerating tank in such a way that no residual SBR will occur in that tank. This provides for effective prevention of the generation of R—Cl or R—SO$_4$ form resins due to contact with the SAR regenerant HCl or H$_2$SO$_4$.

The purposes of the present invention can be satisfactorily attained by performing the first through third stages described above. If stricter control of water quality is required as in PWR power plants, the sequence of second and third stages is preferably repeated after the third stage as indicated by the following scheme:

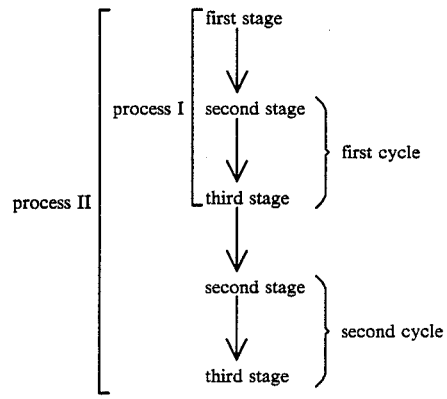

In process II, an additional cycle of the second and third steps is performed following process I. In this case, the flow rate of sluicing water supplied in the first cycle of second and third steps is decreased as compared with the case of process I, thereby enabling a higher flow rate of sluicing water to be supplied in the second cycle of second and third steps. A schedule of the supply of sluicing water in each of the processes I and II is shown in Table 1.

TABLE 1

| | Flow rate of sluicing water supplied | |
|---|---|---|
| | Process I | Process II |
| first stage | $Q_1$: LV = 2 − 4 m/hr | $Q_1$: LV = 2 − 4 m/hr |
| second stage (first cycle) | $Q_2$: LV = 10 − 16 m/hr | $Q_2$: LV = 6 − 10 m/hr |
| third stage (first cycle) | $Q_2$: LV = 10 − 16 m/hr | $Q_2$: LV = 6 − 10 m/hr |
| second stage (second cycle) | — | $Q_3$: LV = 10 − 16 m/hr |
| third stage (second cycle) | — | $Q_3$: LV = 10 − 16 m/hr |

The present inventors confirmed by experimentation that when the first cycle of the second and third steps was performed with sluicing water $Q_2$ being supplied at a LV of 6–10 m/hr, a smaller amount of residual SBR 2' (hatched in FIG. 4) formed in the tank than what remained after the first step was performed in process I, thereby achieving a significant decrease in the finally remaining SBR 2' as compared with process I when the procedures of SBR transfer had been completed. This result could be explained as follows: by progressively increasing the supply of sluicing water from LV=6-10 m/hr employed in the first cycle of the second and third stages to LV=10-16 m/hr in the second cycle of the second and third steps, the length of l'' indicated in FIG. 4 becomes progressively small in such a way as to achieve effective lifting of the particles of SBR 2'.

The efficiency of the transfer of SBR 2' is further increased by performing the third cycle of second and third steps under the same conditions as in the second cycle but according to the experiment conducted by the present inventors, results satisfactory for practical purposes were attained by performing the process up to the third step of the second cycle.

A typical scheme of the process of the present invention is hereunder described with particular reference to FIG. 1. First, the procedures of process I are described.

First stage

Valves 16 and 17 are opened and backwashing water is supplied at a rate of 8-12 m/hr to separate the mixed resin bed into two layers. Valves 16 and 17 are then closed and resin SAR is allowed to settle. Valves 23 and 18 are opened and pressurized water 8 and sluicing water $Q_1$ are supplied at flow rates (LV) of 4-5 m/hr and 2-4 m/hr, respectively, so as to transfer the greater part of SBR to an anion regeneration tank (not shown) with valve 9 being opened.

In this stage sluicing water is supplied through the intermediate sluicing pipe 11, not through the lower water collecting unit 10 as in the prior art. As a result of introduction of water through the lateral pipes on the intermediate sluicing pipe 11, SAR 1 lying below SBR 2 forms a stationary bed.

Step of purging SBR 2''from the neighborhood of the lower water collecting unit 10

Valve 22 is opened and compressed air is supplied; at the same time, valve 25 is opened and the water in the freeboard is drained through a freeboard drain pipe 24 that is disposed 200-300 mm above the open end 4' of the resin transfer pipe 4, until the water level becomes equal to the position of the drain pipe 24. Then, valves 22 and 25 are closed and valves 16 and 17 are opened so that backwashing water 3 is supplied at a commonly employed flow rate (LV=8-12 m/hr). One to two minutes later, valve 21 is also opened and air 15 is supplied at LV of 40-120 m/hr so that flushing with a two-phase stream of backwashing water and air is performed until the water level in the tank approaches an upper water collecting unit 26.

As a result of these procedures, residual SBR 2''in the neighborhood of the lower water collecting unit 10 is purged and the amount of SBR 2'' remaining in the tank is reduced to a level not higher than 0.05% of the total SBR.

Second stage

Valve 21 is closed and backwashing is performed by supplying backwashing water 3 with valves 16 and 17 being left open. Two to three minutes later, valve 19 is opened and sluicing water $Q_2$ is supplied at LV of 10-16 m/hr. Sluicing water $Q_2$ may be introduced simultaneously with backwashing water 3. As a result, a linear velocity of 8-12 m/hr is provided by backwashing water 3 below the intermediate sluicing pipe 11 while LV of at least 20 m/hr is created above the pipe 11 by the combination of backwashing water 3 and sluicing water $Q_2$. In the second step, SBR 2''purged in the previous step is carried to the surface layer of SAR 1 and collected as SBR 2'. The purpose of the second step is satisfactorily attained by performing it for 5-6 minutes.

Third stage

Following the second stage, a settling treatment is performed. This may be done with all valves closed; alternatively, sluicing water $Q_2$ may be continuously supplied with valves 19 and 17 left open. All that is required to accomplish in this step is to form a stationary SAR bed below the lateral pipes 12 on the intermediate sluicing pipe 11.

In the next place, valves 19 and 23 are opened and sluicing water $Q_2$ and pressurized water 8 are introduced at flow rates (LV) of 10-16 m/hr and 4-5 m/hr, so that the particles of residual SBR 2' are lifted in the water in the freeboard and transferred from the tank with valve 9 being opened. This stage is typically performed for a period of 5-10 minutes.

Process II may be performed in the following manner.

First stage

Same as in process I.

Step of purging SBR 2'' from the neighborhood of the lower water collecting unit 10

Same as in process I.

Second stage (in first cycle)

Same as in process I except that sluicing water $Q_2$ is supplied at LV of 6-10 m/hr. It suffices that this step is performed for about 5 minutes.

Third stage (in first cycle)

Same as in process I except that sluicing water $Q_2$ is supplied at LV of 6-10 m/hr. It suffices that this step is performed for about 5 minutes.

Second stage (in second cycle)

Same as in the second stage of the first cycle except that sluicing water $Q_3$ is supplied at LV of 10-16 m/hr with valve 20 being opened instead of valve 19. If suffices that this step is performed for about 5 minutes.

Third stage (in second cycle)

Same as in the third step of the first cycle except that sluicing water $Q_3$ is supplied at LV of 10-16 m/hr with valve 20 being opened instead of valve 19. It suffices that his step is performed for about 5-10 minutes.

The present invention is hereinafter described with reference to working examples and comparative examples. It should, however, be noted that various modifications may be made to these examples without departing from the scope of the present invention.

COMPARATIVE EXAMPLE 1

A separation tank having an inside diameter of 1,800 mm and a height of 5,000 mm was paced with a mixture of 4,500 l of Dowex® TG 650C (serving as SAR) and 2,000 l of Dowex® TG 550A (SBR). A resin transfer pipe was installed in the tank in such a way that its open end would be positioned on the central axis of the tank and 150 mm below the interface between separate layers of SAR and SBR.

After SAR and SBR were intimately mixed, the following steps were taken.

1. Resin separation by backwashing: Backwashing water 3 supplied for 30 minutes at LV of 10 m/hr.
2. Transferring SBR: SBR was transferred from the lower water collecting unit at LV of 2.5 m/hr, and from the upper water collecting unit at LV of 4 m/hr.

The results are summarized in Table 2.

The amount of residual SBR was measured by the following procedures: after SBR transfer was completed, the tank was drained of water; uniform sampling was conducted for each resin layer in the direction of its depth; and the amount of residual SBR was determined by gravitational separation with NaOH.

COMPARATIVE EXAMPLE 2

Following the procedures taken in Comparative Example 1, residual SBR 2" forming around the lower water collecting unit was purged employing the same equipment and resins. After the water level was lowered to 300 mm below the resin surface layer, backwashing water and air were supplied to said lower water collecting unit for 4 minutes at respective flow rate (LV) of 10 m/hr and 100 m/hr. Following backwashing that was conducted for 20 minutes at LV of 10 m/hr, SBR transfer was performed according to the following schedule:

Transfer from the lower water collecting unit: LV=4 m/hr.

Transfer from the upper water collecting unit: LV=4 m/hr.

Duration: 10 minutes.

The results are shown in Table 2.

EXAMPLE 1

A separation tank of the same type as used in Comparative Examples 1 and 2 was employed except that the separating transfer pipe 11 was modified as noted below. This tank was packed with the same resins as those employed in Comparative Examples 1 and 2. Resin transfer was performed in accordance with process I.

Structural design of sluicing pipe II (see FIGS. 1–3)

| | |
|---|---|
| Number of lateral pipes: | 4 |
| Inside and outside diameters of lateral pipes 12: | 35.7 mm × 42.7 mm |
| Diameter and pitch of orifices 13: | 4 mm$^\phi$ and 70 mm |
| Net surrounding the lateral pipes: | Saran ® net of 60–70 mesh |
| Distance between e and f ($L_1$): | 150 mm |
| Distance between f and d ($L_2$): | 50 mm |

Operating procedures

First of all, backwashing water was supplied at LV of 10 m/hr to perform backwashing for 10 minutes so as to separate the mixed resin bed into two layers.

First stage

Sluicing water ($Q_1$) supplied at LV of 2.5 m/hr, Pressurized water supplied from the top of the tank at LV of 4 m/hr. This step was performed for 20 minutes.

Step of purging SBR 2" from the neighborhood of the lower water collecting unit

The water level was lowered to 300 mm below the surface resin layer. Thereafter, backwashing water and air were supplied to the lower water collecting unit for 4 minutes at respective flow rates (LV) of 10 m/hr and 100 m/hr.

Second stage

Subsequently, backwashing water was supplied was supplied to the lower water collecting unit at LV of 10 m/hr so as to perform backwashing for 2 minutes. Sluicing water was then supplied through the intermediate sluicing pipe for 5 minutes LV of 14 m/hr.

Third stage

The supply of backwashing water was stopped and sluicing water was introduced through the intermediate sluicing pipe at LV of 14 m/hr while the resin layer below the sluicing pipe was allowed to settle. Thereafter, with the supply of sluicing water being continued, pressurized water was supplied from the top of the tank at LV of 4 m/hr, so as to transfer the residual SBR 2' for 10 minutes.

The results are shown in Table 2.

EXAMPLE 2

The procedures of Example 1 were repeated except that the distance ($L_1$) between e and f was changed to 180, 80, 50 and 30 mm. The results are shown in Table 2.

EXAMPLE 3

The procedures of Example 1 were repeated except that the position of d, or the interface between separated resin layers, was made equal to the position of the open end 4' of the resin transfer pipe ($L_2=0$ mm) or 50 mm below the position of said open end ($L_2=-50$ mm). The results are shown in Table 2.

EXAMPLE 4

Using the same apparatus as employed in Example 1, resin separation and transfer was performed in accordance with the following schedule of process II.

Operating procedures

First, backwashing water was supplied at LV of 10 m/hr so as to perform backwashing for 10 minutes until the mixed resin bed separated into two layers.

First step

Sluicing water ($Q_1$) was supplied at LV of 2.5 m/hr. Pressurized water was supplied from the top of the tank at LV of 4 m/hr. This step was performed for 20 minutes.

Step of purging SBR 2" from the neighborhood of the lower water collecting unit

The water level was lowered to 300 mm below the surface resin layer. Backwashing and air were supplied to the lower water collecting unit for 4 minutes at respective rates (LV) of 10 m/hr and 100 m/hr.

Second stage in the first cycle

Subsequently, backwashing water was supplied to the lower water collecting unit LV of 10 m/hr to perform backwashing for 2 minutes. Sluicing water was then supplied through the intermediate sluicing pipe for 5 minutes at LV of 8 m/hr.

Third stage in the first cycle

The supply of backwashing water was stopped and sluicing water was supplied through the intermediate sluicing pipe at LV of 8 m/hr while the resin layer below the sluicing pipe was allowed to settle. Thereafter, with the supply of sluicing water being continued, pressurized water was introduced from the top of the tank at LV of 4 m/hr so as to transfer residual SBR 2' for 5 minutes.

Second stage in the second cycle

Subsequently, backwashing water was supplied to the lower water collecting unit at LV of 10 m/hr to perform backwashing for 2 minutes. Sluicing water was then supplied through the intermediate sluicing pipe for 3 minutes at LV of 14 m/hr.

Third stage in the second cycle

The supply of backwashing water was stopped and sluicing water was supplied through the intermediate sluicing pipe at LV of 14 m/hr while the resin layer below the sluicing pipe was allowed to settle. Thereafter, with the supply of sluicing water being continued, pressurized water was introduced from the top of the tank at LV of 4 m/hr so as to transfer residual SBR 2' for 10 minutes.

The results are shown in Table 2.

EXAMPLE 5

The procedures of Example 4 were repeated except that the flow rate of sluicing water supplied through the intermediate sluicing pipe in the second and third steps in the second cycle was changed to LV of 10, 12 and 16 m/hr. The results are shown in Table 2.

TABLE 2

| | Volume of Residual SBR (l) | | | |
|---|---|---|---|---|
| | in the surface layer of SAR 1 | in the layer of SAR 1 | around the lower water collecting unit | total of residual SBR (%)* |
| Comparative Example 1 | 15 | 9 | 65 | 89 (4.5) |
| Comparative Example 2 | 14 | 0.5 | 0.4 | 14.9 (0.75) |
| Example 1 | 1.4 | 0.5 | 0.4 | 2.3 (0.12) |
| Example 2 | | | | |
| $L_1$ = 180 mm | 1.3 | 0.5 | 0.4 | 2.2 (0.11) |
| $L_1$ = 80 mm | 1.5 | 0.5 | 0.4 | 2.4 (0.12) |
| $L_1$ = 50 mm | 3.0 | 0.5 | 0.4 | 3.9 (0.2) |
| $L_1$ = 30 mm | 9.0 | 0.5 | 0.4 | 9.9 (0.5) |
| Example 3 | | | | |
| $L_2$ = 0 mm | 1.4 | 0.5 | 0.4 | 2.3 (0.12) |
| $L_2$ = −50 mm | 1.4 | 0.5 | 0.4 | 2.3 (0.12) |
| Example 4 | 0.3 | 0.35 | 0.35 | 1.0 (0.05) |
| Example 5 | | | | |
| LV = 10 m/hr | 0.5 | 0.4 | 0.4 | 1.3 (0.065) |
| LV = 12 m/hr | 0.3 | 0.35 | 0.35 | 1.0 (0.05) |
| LV = 16 m/hr | 0.3 | 0.35 | 0.35 | 1.0 (0.05) |

*Figures in brackets indicate proportions based on 2,000 l of total SBR.

As Table 2 shows, the present invention provides a reliable process for reducing the amount of a residual anion resin (SBR) in a cation regeneration tank to 0.1% and below (Examples 4 and 5). Therefore, the formation of R—Cl or R—SO₄ in significantly reduced as compared with the result of the prior art.

In addition, the process of the present invention enables efficient separation and transfer of SBR in a fully automatic and unattended way in spite of variations in the resin level (as in Example 3) or in the supply rate of sluicing water (as in Example 5). This process solves all of the problems associated with the prior art and is anticipated to make great contribution to industries at large.

What is claimed is:

1. A method for separating and transferring an ion-exchange resin from a separation tank packed with a mixed bed of two ion-exchange resins having different specific gravities, said method comprising:
   (A) A first stage comprising the following steps:
      (1) separating the mixed ion-exchange resin bed into two layers in said separation tank, and upper layer and a lower layer, wherein the upper layer has a lower specific gravity than the lower layer;
      (2) settling the two layers,
      (3) adding sluicing water to said separation tank at a flow rate of 2–4 m/h through a perforated separating and transferring intermediate sluicing pipe positioned below the interface between the separated resin layers,
      (4) adding pressurized water to said separation tank from above, the pressure of which is such that the greater part of the ion-exchange resin in the upper layer having the smaller specific gravity can be transferred from the separation tank to another tank though the opening of a resin transfer pipe positioned above the intermediate sluicing pipe in said separation tank,
      (5) transferring said greater part of the ion-exchange resin in the upper layer through the opening of said resin transfer pipe to an anion regeneration tank,
   (B) a second stage which comprises introducing backwashing water into said separation tank, through a lower water collecting unit located at the lower portion of the separation tank or through both said intermediate sluicing pipe, and said water collecting unit;
   (C) a third stage in which, after resin settling, the residual ion-exchange resin having a smaller specific gravity which remains unseparated from the ion-exchange resin of a higher specific gravity is separated by introducing sluicing water in said separation tank at a flow rate of 5–20 m/h through the intermediate sluicing pipe so that the ion-exchange resin having the smaller specific gravity is lifted as particles in water in freeboard above the resin layer of higher specific gravity, while introducing said pressurized water from above the tank so as to direct the ion-exchange resin having the smaller specific gravity to the opening of the resin transfer pipe to be transferred therethrough to the regeneration tank.

2. A method according to claim 1 wherein the second and third stages are cyclically repeated a plurality of times after the first through third stages have been performed.

3. A method according to claim 1 wherein the second and third stages are cyclically repeated after the performance of the first through third stages, with the flow rate of sluicing water that is supplied in the third stages through the intermediate sluicing pipe being progressively increased for each additional cycle.

4. A method according to any one of the preceding claims wherein lateral pipes on a perforated intermediate sluicing pipe are covered with a net that permits the passage of water, but not the resins.

5. A method according to claim 4 wherein the distance between said perforated intermediate sluicing pipe and the opening of said resin transfer pipe is adjusted to 50 mm or more.

* * * * *